(12) United States Patent
Baarman

(10) Patent No.: US 10,770,922 B2
(45) Date of Patent: Sep. 8, 2020

(54) RESONANT INDUCTIVE CONVERTER

(71) Applicant: Group Dekko, Inc., Garrett, IN (US)

(72) Inventor: David W. Baarman, Fennville, MI (US)

(73) Assignee: Group Dekko, Inc., Garrett, IN (US)

( * ) Notice: Subject to any disclaimer, the term of this patent is extended or adjusted under 35 U.S.C. 154(b) by 391 days.

(21) Appl. No.: 15/927,361

(22) Filed: Mar. 21, 2018

(65) Prior Publication Data

US 2018/0278095 A1   Sep. 27, 2018

Related U.S. Application Data

(60) Provisional application No. 62/474,297, filed on Mar. 21, 2017.

(51) Int. Cl.
*H02J 50/12*   (2016.01)
*H02J 7/02*   (2016.01)
*H02J 50/70*   (2016.01)
*B25H 1/02*   (2006.01)
*H02J 7/00*   (2006.01)

(52) U.S. Cl.
CPC .............. *H02J 50/12* (2016.02); *H02J 7/025* (2013.01); *H02J 50/70* (2016.02); *B25H 1/02* (2013.01); *H02J 7/0042* (2013.01)

(58) Field of Classification Search
CPC ....................................................... H02J 50/12

USPC .......................................................... 320/108
See application file for complete search history.

(56) References Cited

U.S. PATENT DOCUMENTS

| | | | | |
|---|---|---|---|---|
| 2011/0259694 | A1* | 10/2011 | Matsumura | B60K 1/04 191/10 |
| 2011/0276208 | A1* | 11/2011 | Sasaki | B60K 6/365 701/22 |
| 2012/0235636 | A1* | 9/2012 | Partovi | H02J 5/005 320/108 |
| 2013/0038281 | A1* | 2/2013 | Sakakibara | B60L 5/005 320/108 |
| 2016/0056664 | A1* | 2/2016 | Partovi | B60L 53/126 307/104 |

* cited by examiner

*Primary Examiner* — Jerry D Robbins
(74) *Attorney, Agent, or Firm* — Taylor IP, P.C.

(57) ABSTRACT

A system that converts between electromagnetic configurations for power transfer including an inductive power supply defining a driver, a primary resonator coil, a secondary resonator coil, a secondary inductive coil and an electromagnetic shield. The primary resonator coil is powered by the driver. The secondary resonator coil is electromagnetically coupled to the primary resonator coil. The secondary inductive coil transfers power to a wirelessly powered device, and the secondary inductive coil is electrically connected to the secondary resonator coil. The electromagnetic shield is positioned to provide electromagnetic shielding of the secondary inductive coil from the secondary resonator coil.

20 Claims, 8 Drawing Sheets

Resonant Inductive Converter

RESONANT INDUCTIVE CONVERTER

This is a non-provisional application based upon U.S. provisional patent application Ser. No. 62/474,297, entitled "RESONANT INDUCTIVE CONVERTER", filed Mar. 21, 2017, which is incorporated herein by reference.

BACKGROUND OF THE INVENTION

1. Field of the Invention

The present invention relates to an electrical power conveyance device, and, more particularly to, electrical power conveyance devices that bridge two configurations of wireless power conveyance and which may be mounted in a work surface.

2. Description of the Related Art

In many applications, electrical receptacles are needed to receive and distribute power. They are required in permanent locations such as walls in fixed structures, as well as temporary locations such as modular office furniture. Many types of receptacles are required according to the needs of users.

Wireless power transfer techniques mainly fall into two categories, near field power transfer and radiative power transfer. With near field power transfer, which can be considered a non-radiative technique, power is transferred by magnetic fields using inductive coupling between coils of wire, or by electric fields using capacitive coupling between metal electrodes. Inductive coupling is the most widely used wireless electric power transfer technology, with it finding applications for the charging of handheld devices such as cell phones, handheld computers and electric toothbrushes. In the medical field chargers for implantable cardiac pacemakers utilize this technique as well.

With a far-field or radiative power transfer technique, electrical power is transferred by beams of electromagnetic radiation, by way of microwaves or laser beams. These techniques can transport energy longer distances but must be aimed at the receiver. Applications for this type are solar power satellites, and wireless powered drone aircraft.

Resonant inductive coupling is a form of inductive coupling in which power is transferred by magnetic fields between two resonant circuits (also referred to as tuned circuits), one in the transmitter and one in the receiver. Each resonant circuit includes a coil of wire connected to a capacitor, or a self-resonant coil or other resonator with internal capacitance. The two resonant circuits are tuned so that they resonate at the same frequency. This coupled resonance between the coils greatly increases the coupling and efficiency of the electrical power transfer.

The proliferation of portable wireless devices such as mobile phones, tablet, and laptop computers has driven the development of mid-range wireless powering and charging technology, so that the tethering of a charging apparatus to wall plugs during a charging cycle can be eliminated. The Wireless Power Consortium was established in 2008 to develop interoperable standards across manufacturers. Its Qi inductive power standard was published in August 2009 to encourage the manufacture of high efficiency charging and powering of portable devices of up to 5 watts over distances of 4 cm (1.6 inches). The wireless device is placed proximate to a charger plate (which can be embedded in table tops) and power is transferred from a flat coil in the charger to a similar one in the portable device.

Presently some inductive electromagnetic configurations require a hole to be cut into a work surface that can weaken the work surface structure.

Some known examples of wireless power transfer relate to chargers available utilizing the Qi technology following the Wireless Power Consortium standard as one aspect of this design and a configuration call resonance referenced by a standard called Airfuel. The combination of the best aspects of these configurations provide new solutions while maintaining compatibility.

A difficulty with prior art technologies is the ability to transfer power over larger distances while minimizing field impact to the power recipient devices.

What is needed in the art is an electrical power conveying system that will allow a work surface accessible wireless charging station, while minimizing stray electromagnetic radiation.

SUMMARY OF THE INVENTION

The present invention is directed to a resonate inductive converter, and more particularly a power converter that has a shielded resonate portion.

The present invention provides a system that converts between electromagnetic configurations for power transfer including a first inductive power supply defining a driver, a primary resonator coil, a secondary resonator coil, a secondary inductive coil and an electromagnetic shield. The primary resonator coil is powered by the driver. The secondary resonator coil is electromagnetically coupled to the primary resonator coil. The secondary inductive coil transfers power to a wirelessly powered device, and the secondary inductive coil is electrically connected to the secondary resonator coil. The electromagnetic shield is positioned to provide electromagnetic shielding of the secondary inductive coil from the secondary resonator coil.

An advantage of the present invention is that the device to be charged is protected from electromagnetic interference that can result from proximity to a resonate circuit.

Another advantage of the present invention is that the power converter can be integral with a work-surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
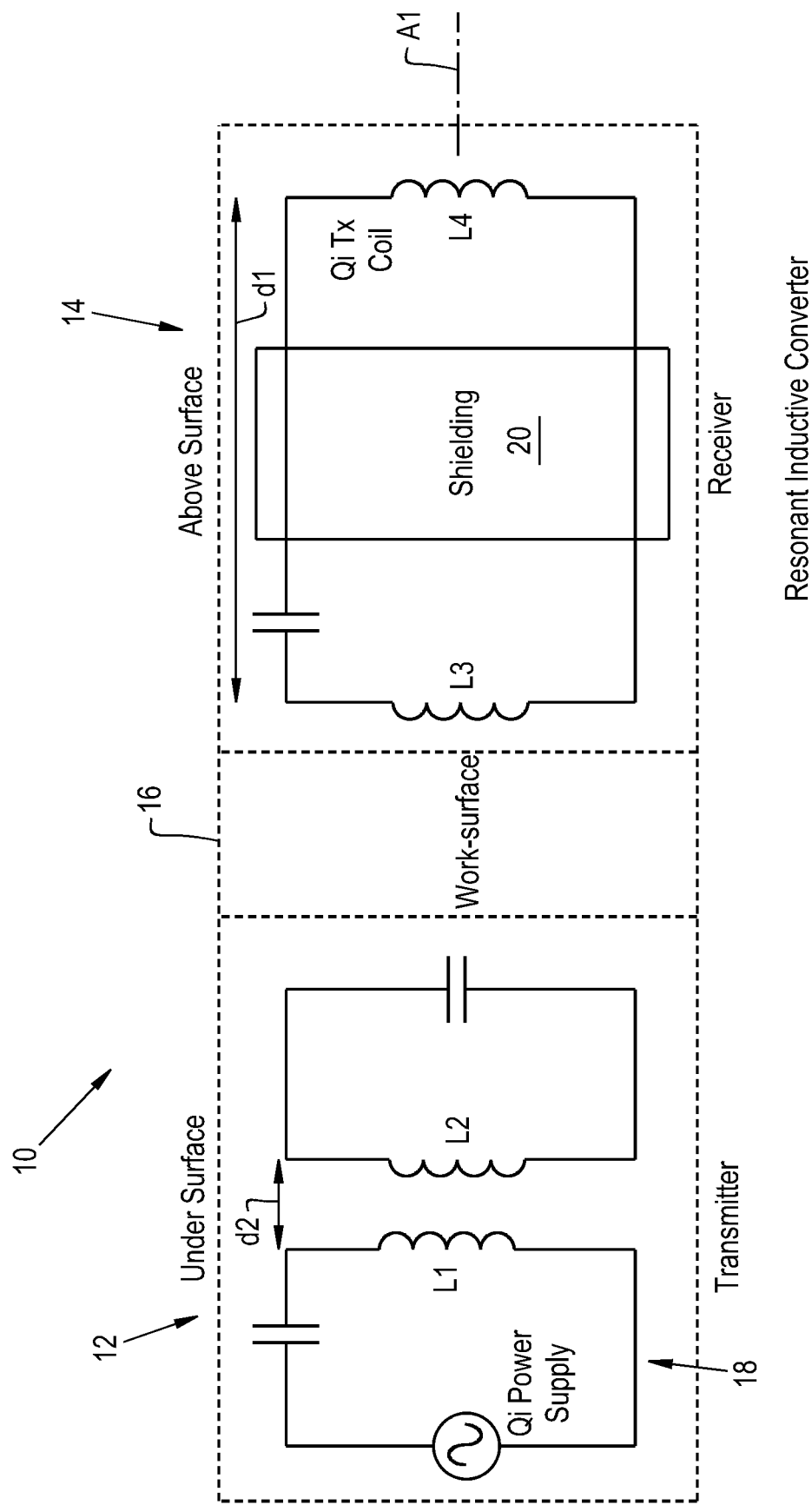
FIG. 1 illustrates one embodiment of a resonate inductive converter with an electromagnetic configuration that converts a standard inductive power supply to a highly resonant configuration, and transferring power through a work-surface over a distance equivalent of the thickness of a table top and then shielding and converting that magnetic configuration back to a suitable electromagnetic configuration to power an inductive wireless power receiver, of the present invention.

Referring now to the drawings and more particularly to FIG. 1 there is shown a system 10 that converts between electromagnetic configurations for power transfer to a power receiving device, such as a cell phone. System 10 includes and under surface first portion 12 and an above surface portion 14 separated by a work-surface 16. Work-surface 16 is a non-ferromagnetic member 16, and while first portion 12 is beneath work-surface 16 and above surface portion 14 is above work-surface 16, portions 12 and 14 can be imbedded into work surface 16.

System 10 includes a first inductive power supply 18 defining a driver 18 with primary inductive coil L1, a primary resonator coil L2 powered by the driver 18, a secondary resonator coil L3, a secondary inductive coil L4, and an electromagnetic shield 20. The secondary resonator coil L3 is electromagnetically coupled to the primary resonator coil L2 through work-surface 16. The secondary inductive coil L4 is configured to transfer power to a wirelessly powered device. The secondary inductive coil L4 is electrically connected to secondary resonator coil L3. Electromagnetic shield 20 is positioned to provide electromagnetic shielding of the secondary inductive coil L4 from the secondary resonator coil L3.

Figure 2:
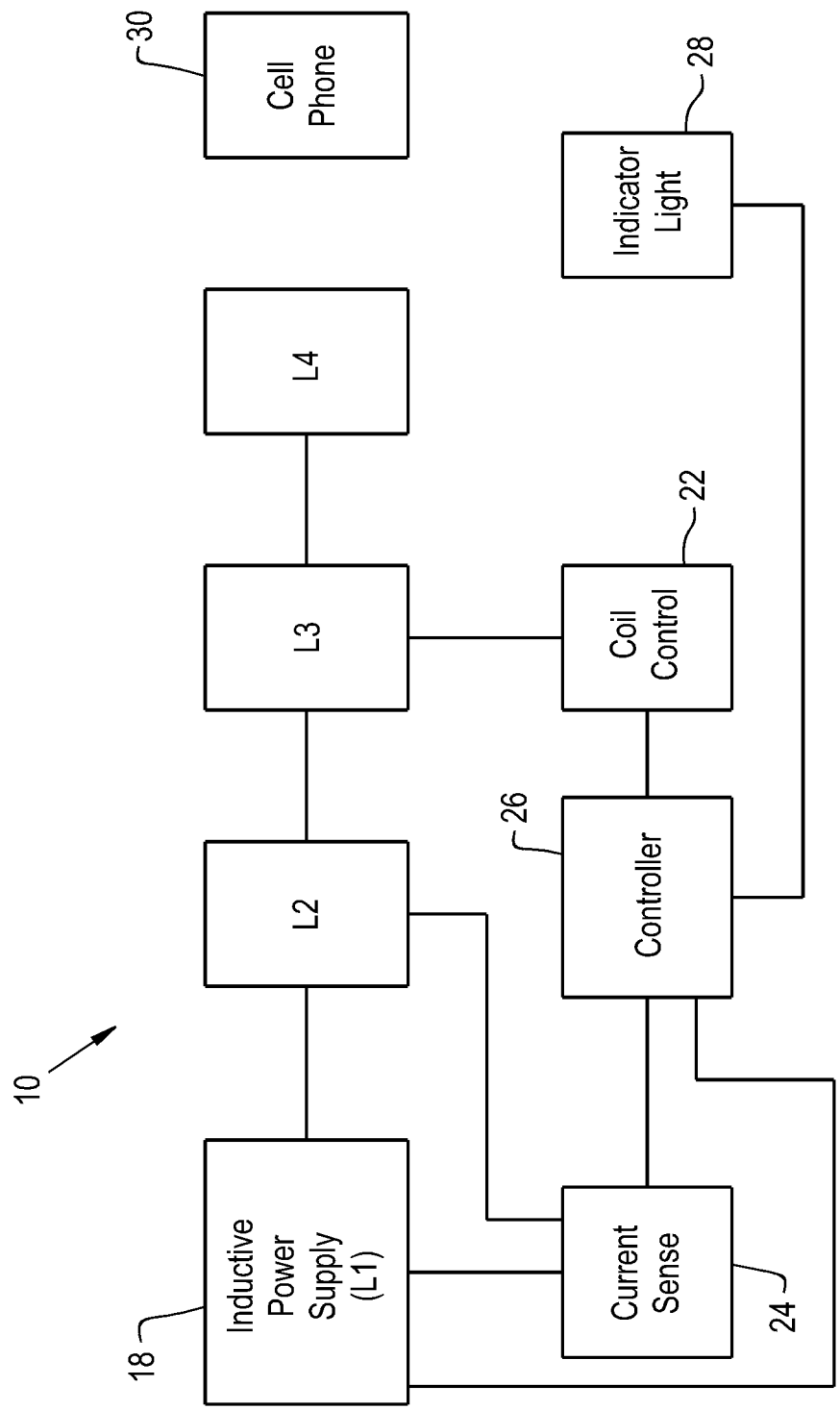
FIG. 2 schematically illustrates, in block form, elements of the power transfer device of FIG. 1.

Now, additionally referring to FIG. 2, secondary resonator coil L3 is coupled to a voltage limiting circuit 22, shown here as coil control 22. An electrical current sensing circuit 24, is coupled to inductive power supply 18 each being under the control of a controller 26. An indicator light 28 provides a visual indicator to a user that a wirelessly powered device 30, shown here as a cell phone 30, is coupled to secondary inductive coil L4 to thereby receive electrical power by way of the electromagnetic coupling provided by secondary inductive coil L4.

The non-ferromagnetic member 16 is positioned between primary resonator coil L2 and secondary resonator coil L3, and non-ferromagnetic member 16 is a generally horizontal work-surface 16. The components of system 10 are arranged relative to work-surface 16, with primary resonator coil L2 being located beneath work-surface 16 and secondary resonator coil L3 being located above work-surface 16 and above primary resonator coil L2. It can be understood that primary resonator coil L2 is coupled to a bottom portion of work-surface 16 and secondary resonator coil L3 is coupled to a top portion of work-surface 16. Secondary resonator coil L3 can even be imbedded into the top portion of work-surface 16 (FIG. 8), with secondary inductive coil L4 being immediately below a top surface of work-surface 16.

Another embodiment of system 10 (FIG. 12) includes a support member 32 coupled to or sitting on work-surface 16, with secondary inductive coil L4 being coupled to support member 32. Support member 32 is configured to support power receiving device 30 so that device 30 can receive electrical power from system 10 and device 30 may use the power to charge a battery or other energy storage component therein. Support member 32 can be positioned at an angle to the top surface of work-surface 16.

Secondary inductive coil L4 is at a first distance d1 from secondary resonator coil L3, while driver 18 is a second distance d2 from primary resonator coil L2, with distance d1 being greater than distance d2.

Driver 18, primary resonator coil L2 and secondary resonator coil L3 are generally symmetrically arranged about a common axis A1. Further, secondary inductive coil L4 may also be generally symmetrically arranged about common axis A1. However, secondary inductive coil L4 can be arranged so that it is not symmetrically arranged about common axis A1, and may be symmetrically oriented about an axis A2.

Electromagnetic shield 20 has a breadth that is substantially the same size as the secondary resonator coil L3.

Indicator 28 alerts a user if power receiving device 30 is receiving power from the secondary inductive coil L4. Indicator 28 can be an indicator light 28 that is located proximate to secondary inductive coil L4.

The specific inventive enhancement by the present invention of transferring energy by using inductive to resonant and then back to inductive configurations proves to solve many problems encountered by prior art systems.

In the prior art wireless power systems these electromagnetic configurations have been argued to be incompatible. In fact various standards have been created for each of these types of electromagnetic configuration respectively. Further, highly resonant systems create large fields and can have electromagnetic compatibility issues.

In FIG. 1, there is illustrated one embodiment of a power transfer system 10 of the present invention that converts a highly resonant wireless power system to an inductive electromagnetic configuration. System 10 has lower portion 12 and upper portion 14 with work-surface 16 therebetween. Power supply 18 of lower portion 12 generates the power control signal into L1, which is an inductive power supply that is defined as a driver. That electromagnetic field is transferred from L1 to primary resonator coil L2 thereby exciting a highly resonant field. That electromagnetic energy is transferred through work surface 16 into a receiving secondary resonant coil L3, which is also coupled to secondary inductive coil L4. Resonant coil L3 is electrically connected to secondary inductive coil L4 thereby allowing a transfer of power through secondary inductive coil L4. When a device 30 to be charged is proximate to secondary inductive coil L4 the power is then transferred to that device 30, by way of another magnetic field coupling between that device 30 and coil L4. In the case of a Qi compatible unit communications is also transferred through these coils. The ping voltages and communications modulations are also converted and are maintained at safe operating levels. Shielding 20 is placed between the L3 and L4 coils to shield the electromagnetic field from the previous inductive stages thereby providing the device 10 with improved electromagnetic compatibility (EMC). This gives the distance performance through, for example a 2 inch thick work surface 16, of a highly resonant electromagnetic configuration while providing the EMC and coupling benefits of a closely coupled system. There is a magnetic coupling between coils L1 and L2, a resonant electromagnetic coupling between the resonant circuit that includes coils L2 and L3; an electrical coupling between coils L3 and L4; and finally a magnetic field coupling between coil L4 and a coil in the device 30 to be charged.

In FIG. 2 there is illustrated components of wireless power system 10. This system 10 may utilize a bq501210 transmitter manager for controller 26. Power supply 18 conditions the power for the controller 26 and for the switching of power. Current sense circuit 24 enables feedback from the operation as well as control signal sensing that is decoded by the control chip 26. Another aspect of this controller 26 is the coil drivers are under its control. An FET full bridge driver can be used to create the wireless power signal induced into L1. All the control and communications from this transmitter 12 functions through these additional layers without impact to device 30 as it charges.

Figure 3:
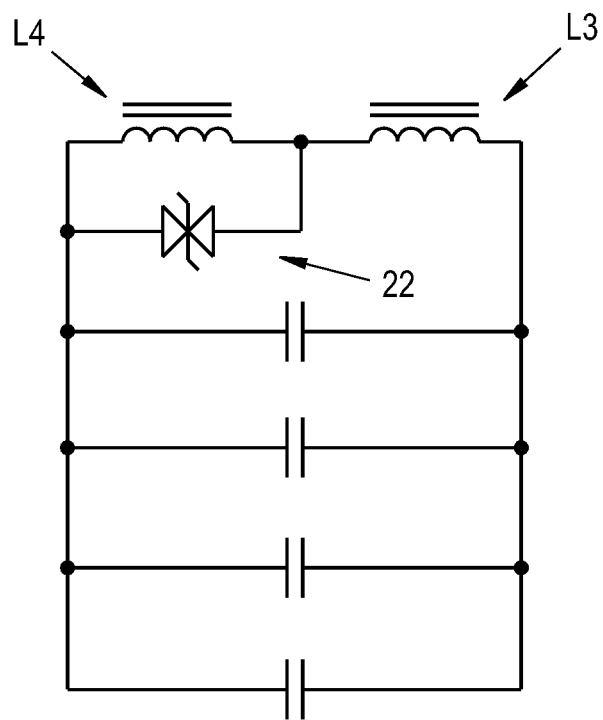
FIG. 3 illustrates an example of a secondary conversion circuit taking the resonant signal back to a compatible magnetic format of the device of FIGS. 1 and 2.
Figure 4:
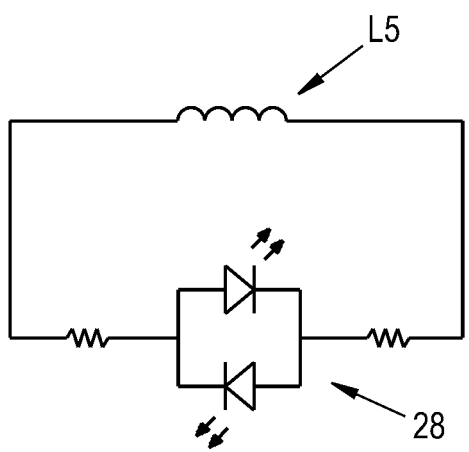
FIG. 4 illustrates an indicator circuit with LEDs to indicate pinging and charging status of the device of FIGS. 1-3.
Figure 8:
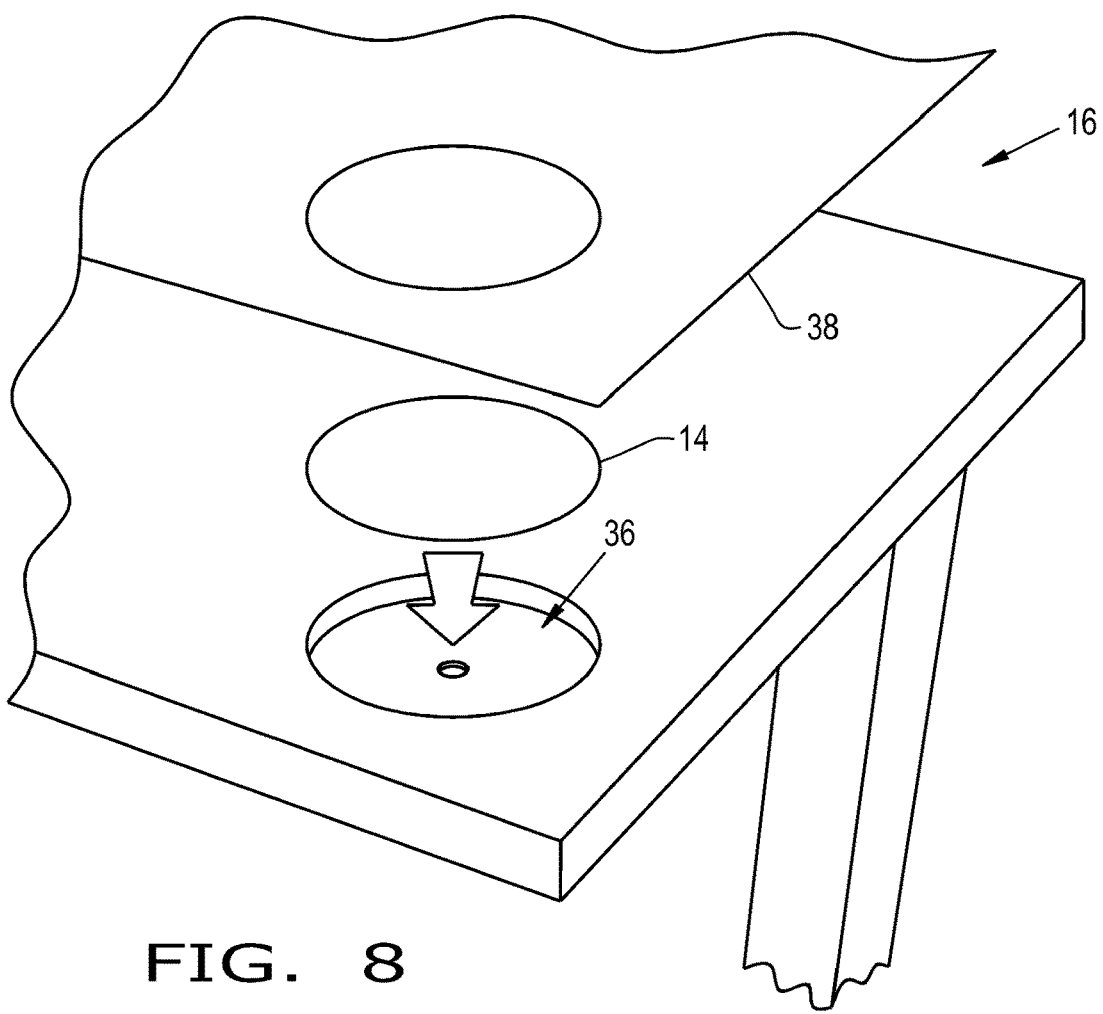
FIG. 8 illustrates one method to assemble the coil beneath the surface to enable clean pre-assembled work surfaces assembled from the top of the device of FIGS. 1-5.

As part of the inventive process, once the wireless power supply 18 and controller 26 is selected we characterize coils L1 and L2 for best performance. This is modeled and values are selected for a given distance that is needed for transfer. In this case we selected a distance of 0.6"-2" simulating typical work surface thicknesses. In FIG. 3 the secondary resonant coil L3 is shown and its connection to secondary inductive coil L4, and in FIG. 4 the indicator loop coil L5 is illustrated. Note the protection device 22 is in parallel with L4 creating a simple voltage limiter for a portion of the circuit. Voltage protection device 22 can be a transient voltage suppression (TVS) diode rated for 1500 watts at 15.3 volts. The circuit of FIG. 3 is designed to be a resonant coil with the two coils L3 and L4 actually in series. One is a Qi coil (L4) and one (L3) is a resonant coil providing both benefits. Although the two coils are connected electrically they are separated magnetically using shielding as shown in FIGS. 1 and 8. The secondary indicator loop of FIG. 4 shows a few parasitic turns used to indicate when power is being transferred by putting an LED light 28 in series with coil L5. The resistors limit the current to these LEDs 28 to control proper operation.

Figure 5:
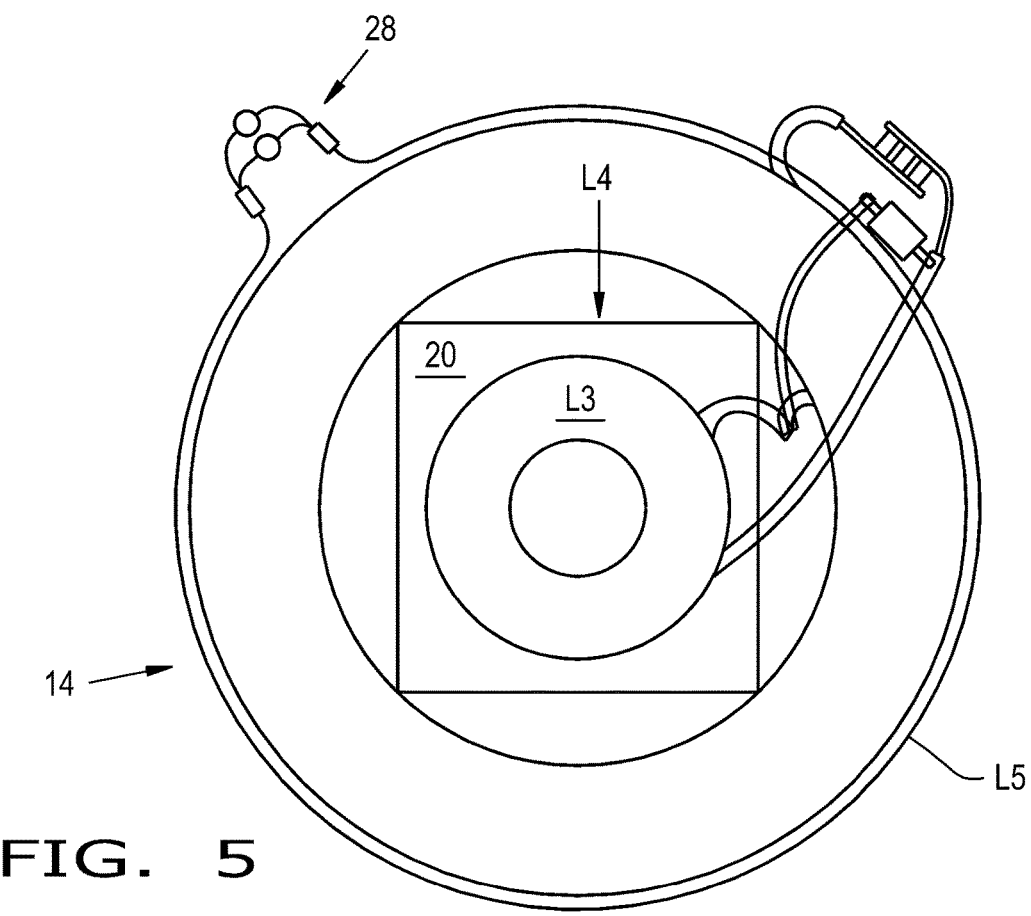
FIG. 5 illustrates the secondary coil assembly that receives the highly resonant field and then shields and transfers that power to an inductive magnetic coupling.

FIG. 5 illustrates the conversion coil. The secondary resonant coil L3 on the bottom side is shown as if being visible through the device. The transfer coil L4 for connection to the device 30 is on the other side of the shielding material from coil L3. This protects secondary inductive coil L4 and any devices 30 that are to be powered wirelessly so that they are protected from the now shielded magnetic fields.

Figure 6:
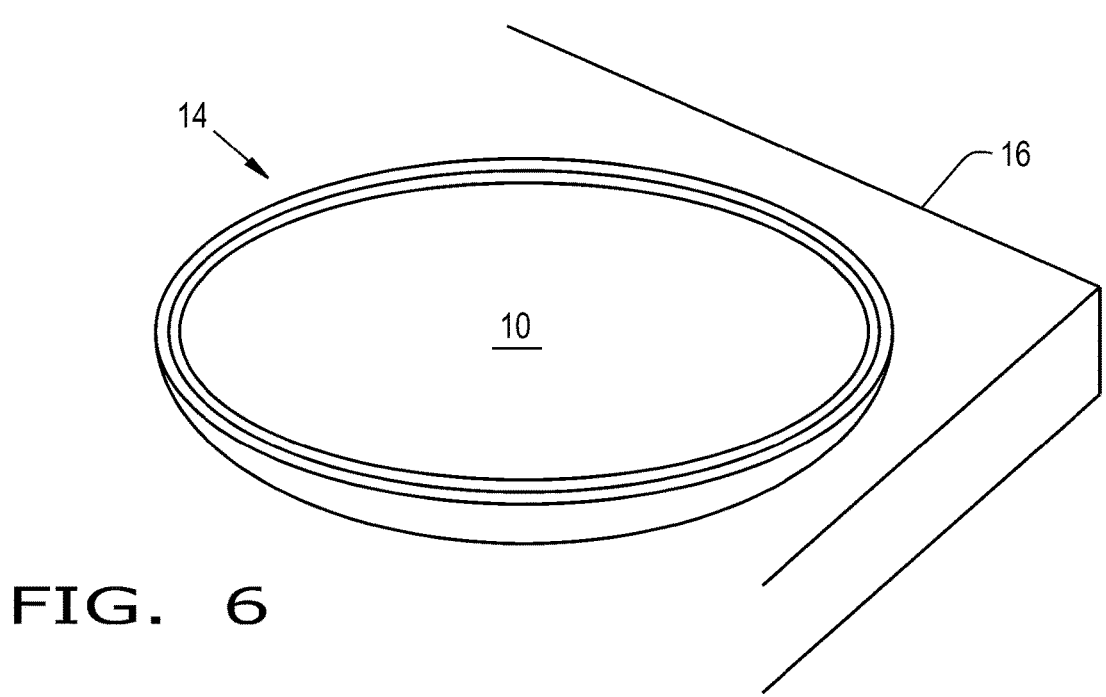
FIG. 6 illustrates one embodiment of a surface puck used to charge devices through a work surface without cords or cables by way of the device of FIGS. 1-5.
Figure 7:
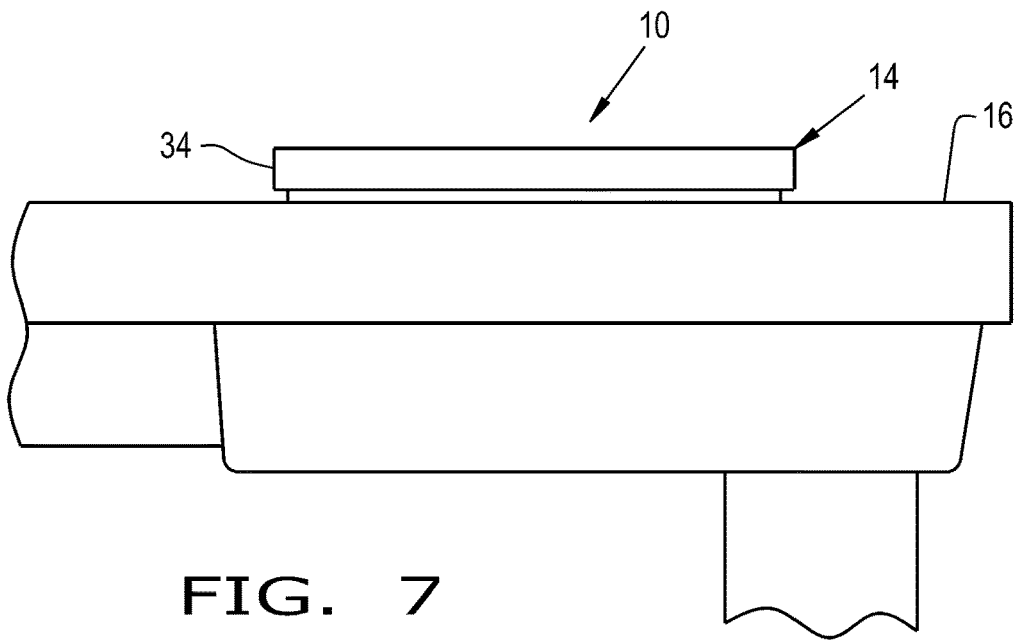
FIG. 7 is a side view that illustrates the top and bottom coil configurations for electromagnetic conversion with a tabletop therebetween of the device of FIGS. 1-5.

FIGS. 6 and 7 illustrate an industrial design and visually appealing embodiment of the configuration, with portion 14 being inserted into a cavity of work-surface 16. The present invention affords the opportunity of limiting or removing wiring that gets manipulated daily by movement, the elimination of which is a reliability enhancement. Portion 14 can be a charging puck 14 that sits on the top surface of work-surface 16. A clear light pipe 34 is shown around the diameter of the charging puck 14 and is driven by the LEDs 28 powered by the parasitic loop L5.

FIG. 8 shows the opportunity of embedding the coil slightly beneath the surface in a cavity 36. Cavity 36 is a routed pocket. The laminate 38 is then laid over the coil 14 for protection. The idea is that these coils can be placed in specific spots and powered when a supply is placed below the chosen charging spots. Coils L4 and L5 are here shown as built into the surface 16 but they can also be used with the puck for additional articulation and freedom.

Figure 9:
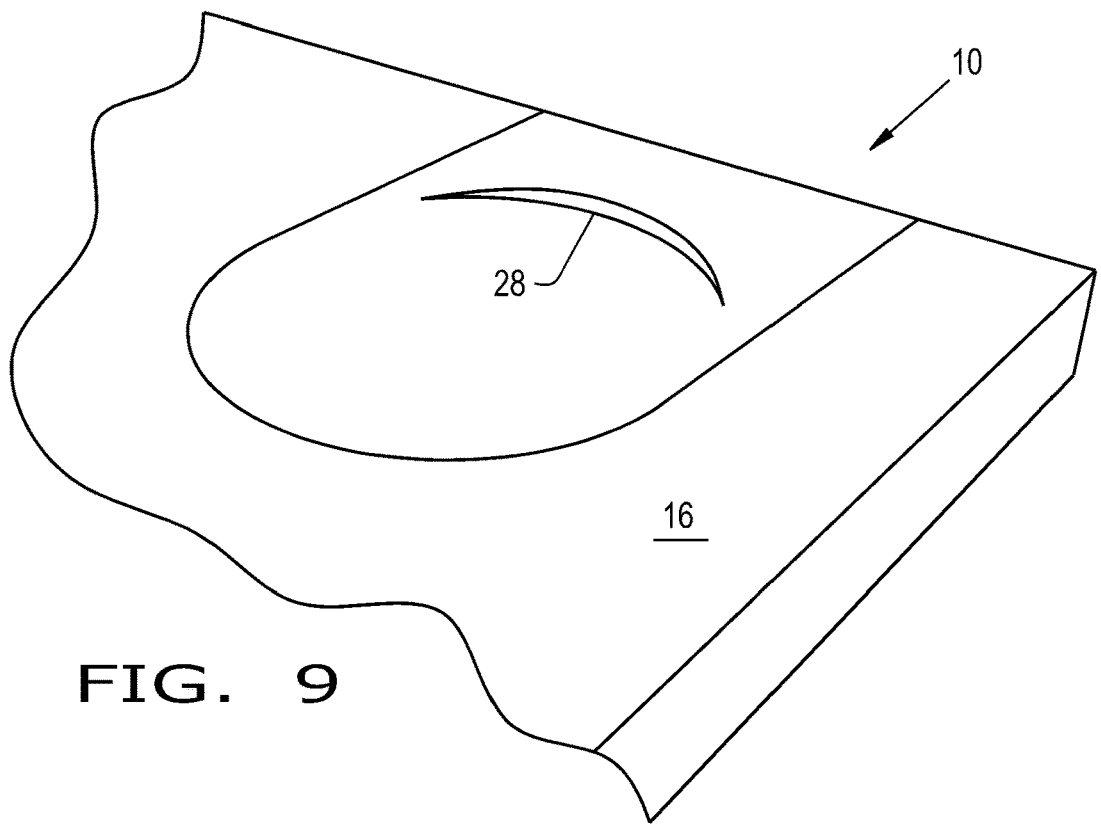
FIG. 9 shows one embodiment of a slide in coil configuration with a LED indicator of the device of FIGS. 1-5.
Figure 10:
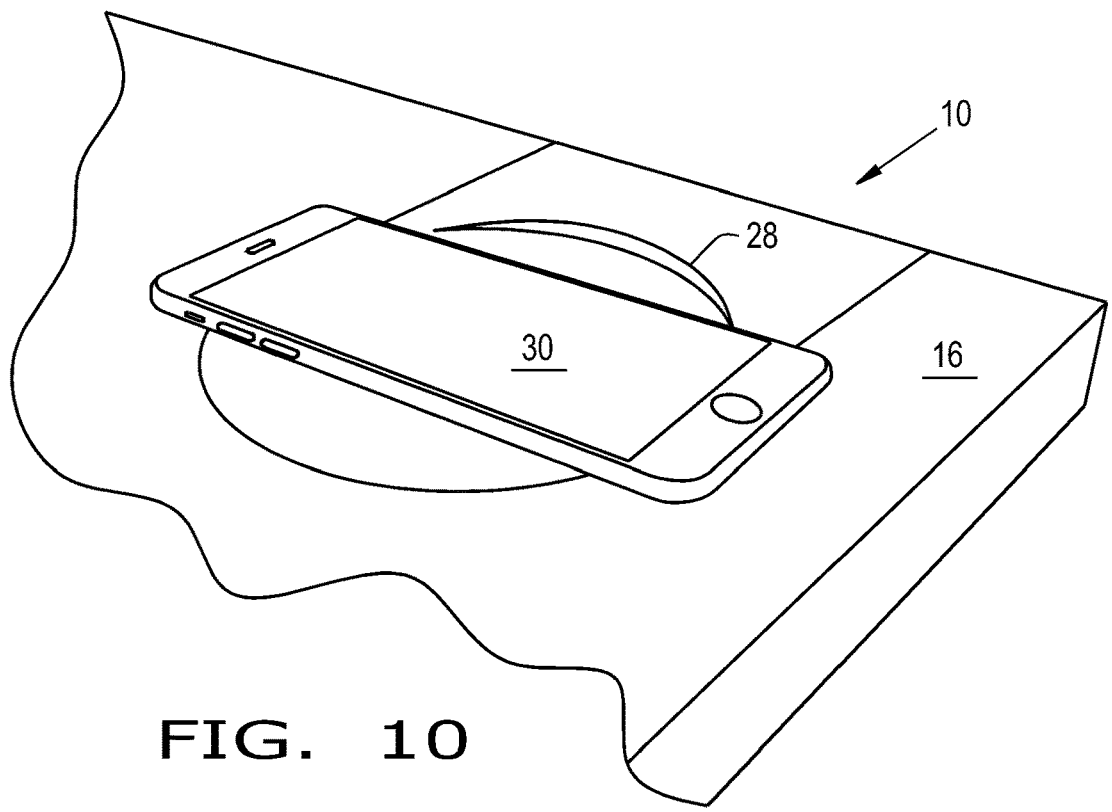
FIG. 10 shows a configuration similar to that of FIG. 9 but also showing the charging of a phone using the device of FIGS. 1-5.

FIGS. 9 and 10 show a side mount feature to help the user find a common spot to charge. This clip like feature could hold the charger 14 and the power supply 12 with no connections between. A routed slot would be used to house the plastics and electronics.

Figure 11:
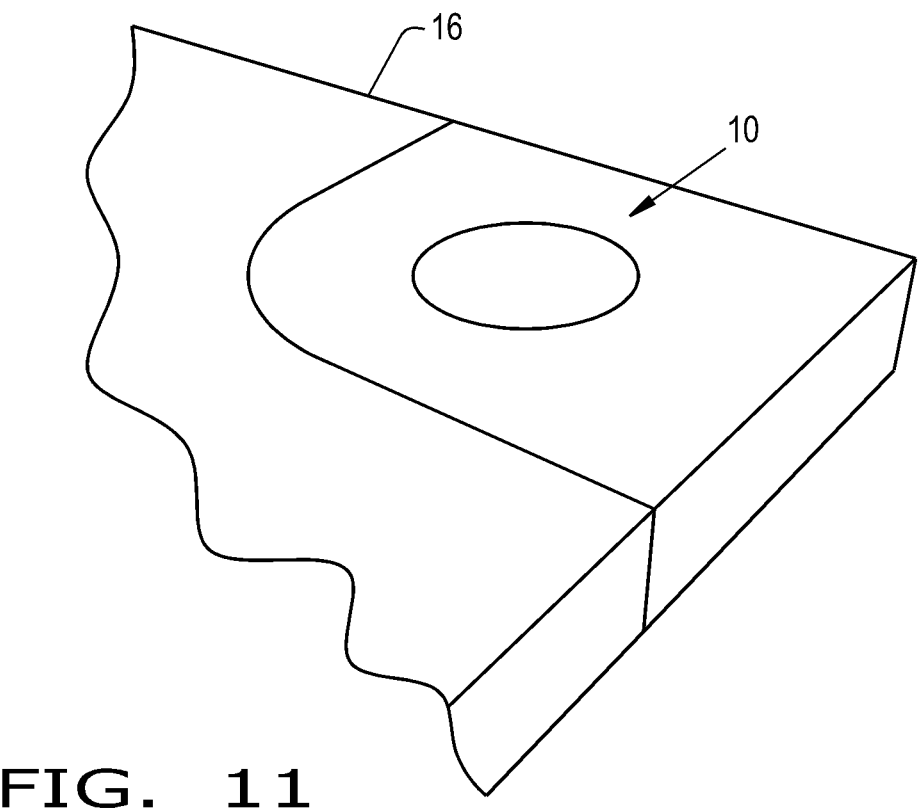
FIG. 11 illustrates a work-surface corner installation of the device of FIGS. 1-5.
Figure 12:
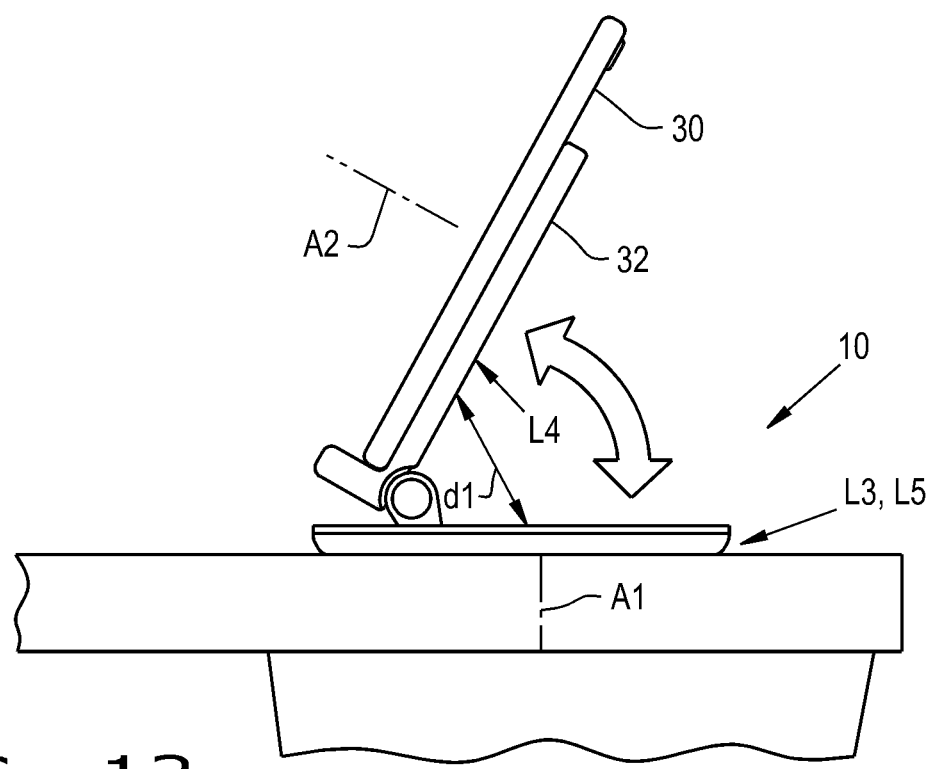
FIG. 12 illustrates a member that is separated from the work-surface yet charging a cell phone using the device of FIGS. 1-5.

FIG. 11 shows a corner mount system for ease of location and installation. FIG. 12 shows the swivel and tilt configuration of member 32. The LEDs 28 and secondary inductive coil L4 is remotely positioned from coil L3 and allows additional articulation of the charger 10. The shielding 20 above coils L3 and L5 prevent EMC issues above the placement on the work-surface 16.

Figure 13:
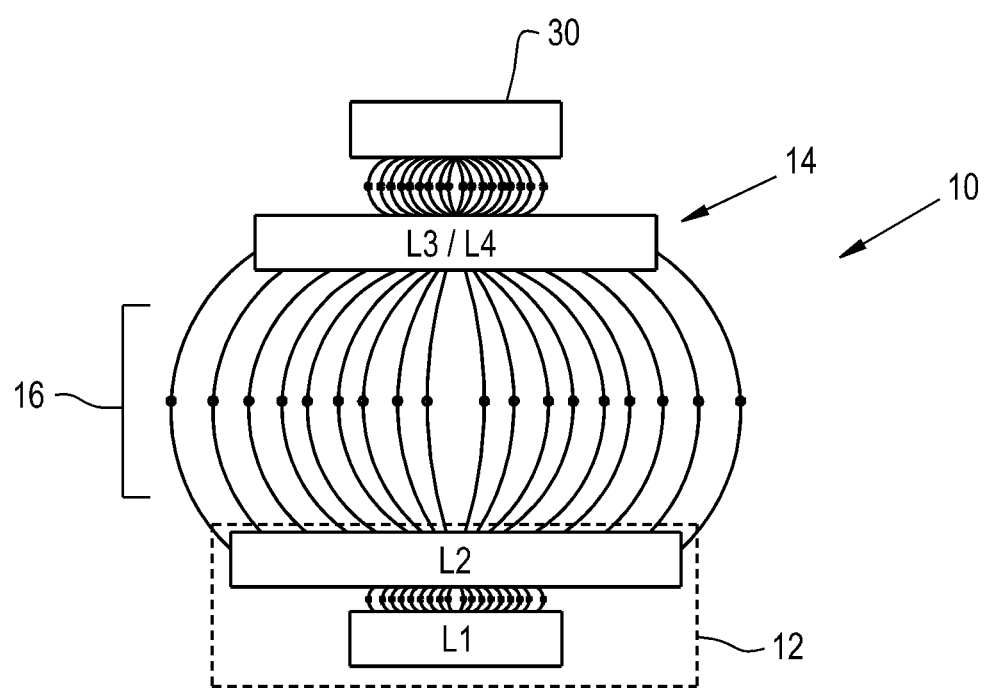
FIG. 13 illustrates the magnetic field couplings of the present invention.

FIG. 13 illustrates the three main electromagnetic fields present in the inventive solution of the present invention. There are two relatively closely coupled magnetic fields arrangements of L1-L2 and L4 to device 30; and the loosely coupled electromagnetic field coupling L2-L3 through the top and bottom of the work surface 16. The loosely coupled field effectively conveys power by being resonantly coupled to enhance the power that can be conveyed and to make the transfer more efficient. The present invention limits the flux and field propagation that can limit device performance and shields the device from the loosely coupled flux.

Although the present invention, as described herein, has been illustrated as being used to charge a wireless device, it is also contemplated that system 10 can be used to wirelessly convey power to operative devices such as computers, test equipment, communications equipment, or basically anything that will consume electrical energy, having an inductive coil that can be electromagnetically coupled to coil L4.

While the present invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system that converts between electromagnetic configurations for power transfer, comprising:
    an inductive power supply defining a driver;
    a primary resonator coil powered by the driver;
    a secondary resonator coil, the secondary resonator coil being electromagnetically coupled to the primary resonator coil;
    a secondary inductive coil to transfer power to a wirelessly powered device, the secondary inductive coil being electrically connected to the secondary resonator coil; and
    an electromagnetic shield positioned to provide electromagnetic shielding of the secondary inductive coil from the secondary resonator coil.

2. The system of claim 1, further comprising a non-ferromagnetic member positioned between the primary resonator coil and the secondary resonator coil.

3. The system of claim 2, wherein the non-ferromagnetic member is a generally horizontal work-surface.

4. The system of claim 3, wherein the primary resonator coil is located beneath the work-surface and the secondary resonator coil is located above the work-surface and above the primary resonator coil.

5. The system of claim 4, wherein the primary resonator coil is coupled to a bottom portion of the work-surface and the secondary resonator coil is coupled to a top portion of the work-surface.

6. The system of claim 5, wherein the secondary resonator coil is imbedded into the top portion of the work-surface.

7. The system of claim 6, wherein the secondary inductive coil is immediately below a top surface of the work-surface.

8. The system of claim 5, further comprising a support member coupled to the work-surface, the secondary inductive coil being coupled to the support member, the support member being configured to support a power receiving device.

9. The system of claim 8, wherein the support member is positioned at an angle to a top surface of the work-surface.

10. The system of claim 8, wherein the secondary inductive coil is at a first distance from the secondary resonator coil, the driver being a second distance from the primary resonator coil, the first distance being greater than the second distance.

11. The system of claim 1, wherein the driver, the primary resonator coil and the secondary resonator coil are generally symmetrically arranged about a common axis.

12. The system of claim 11, wherein the secondary inductive coil is also generally symmetrically arranged about the common axis.

13. The system of claim 11, wherein the secondary inductive coil is not symmetrically arranged about the common axis.

14. The system of claim 1, wherein the electromagnetic shield has a breadth that is substantially the same size as the secondary resonator coil.

15. The system of claim 1, further comprising an indicator that alerts a user if a power receiving device is receiving power from the secondary inductive coil.

16. The system of claim 15, wherein the indicator is an indicator light, the indicator light being proximate to the secondary inductive coil.

17. The system of claim 1, wherein the secondary resonator coil is coupled to a voltage limiting circuit.

18. A work-surface, comprising:
a non-ferromagnetic member having a top surface and a bottom surface; and
a system that converts between electromagnetic configurations for power transfer from the bottom surface to the top surface, the system including:
an inductive power supply defining a driver;
a primary resonator coil powered by the driver;
a secondary resonator coil, the secondary resonator coil being electromagnetically coupled to the primary resonator coil;
a secondary inductive coil to transfer power to a wirelessly powered device, the secondary inductive coil being electrically connected to the secondary resonator coil; and
an electromagnetic shield positioned to provide electromagnetic shielding of the secondary inductive coil from the secondary resonator coil.

19. The work-surface of claim 18, wherein the inductive power supply and the primary resonator coil are located proximate to the bottom surface and the secondary resonator coil is located proximate to the top surface.

20. The work-surface of claim 19, wherein the secondary inductive coil is located above the secondary resonator coil.

* * * * *